(12) United States Patent
Kawahito (10) Patent No.: US 6,313,944 B2
(45) Date of Patent: *Nov. 6, 2001

(54) MICROSCOPE TURRET ASSEMBLY AND A MICROSCOPE

(75) Inventor: Takashi Kawahito, Fujisawa (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,672

(22) Filed: Mar. 9, 1998

(30) Foreign Application Priority Data

Mar. 10, 1997 (JP) .................................................. 9-055012

(51) Int. Cl.[7] ............................ G02B 21/00; G02B 21/06
(52) U.S. Cl. ............................................. 359/388; 359/381
(58) Field of Search .................................. 359/368, 372, 359/381, 384, 385, 387, 388, 390, 394, 389

(56) References Cited

U.S. PATENT DOCUMENTS

| 3,297,391 | * | 1/1967 | Benford et al. | 359/372 |
|---|---|---|---|---|
| 3,512,860 | * | 5/1970 | Hansen et al. | 359/372 |
| 3,721,827 | * | 3/1973 | Reinheimer | 250/201 |
| 4,148,552 | * | 4/1979 | Suzuki et al. | 359/388 |
| 4,210,384 | * | 7/1980 | Meyer et al. | 359/380 |
| 5,198,927 | * | 3/1993 | Rathbone et al. | 359/385 |
| 5,296,962 | * | 3/1994 | Furuhashi | 359/388 |
| 5,517,353 | * | 5/1996 | Iko et al. | 359/388 |
| 5,535,052 | * | 7/1996 | Jorgens | 359/388 |
| 5,633,752 | * | 5/1997 | Tsuchiya et al. | 359/390 |
| 5,719,699 | * | 2/1998 | Otomo | 359/368 |
| 5,808,791 | * | 9/1998 | Kawano et al. | 359/434 |

* cited by examiner

Primary Examiner—Cassandra Spyrou
Assistant Examiner—Jared Treas
(74) Attorney, Agent, or Firm—Finnegan, Henderson, Farabow, Garrett & Dunner, L.L.P.

(57) ABSTRACT

A microscope turret assembly and a microscope with the turret assembly are provided so that active use is made of the space formed on an underside surface of a turret by providing an illuminator or an optical detector therein. The turret retains multiple objective lenses and, by rotation thereof, enables the selection of a single objective lens. At least a part of an illuminator that casts light on an observed specimen via the selected objective lens, or a part of an optical detector that detects light from an observed specimen, is located in the space.

11 Claims, 8 Drawing Sheets

MICROSCOPE TURRET ASSEMBLY AND A MICROSCOPE

BACKGROUND OF THE INVENTION

1. Field of the Invention

The present invention relates to a microscope. More particularly, this invention pertains to a lens turret assembly used in a microscope.

2. Description of the Related Art

Microscopes often have turrets with multiple objective lenses. The turret, by its rotation, provides selection of objective lenses at will. Also, microscopes are frequently equipped with multiples of different illuminators for observation. For example, some microscopical observations involve caged reagents. Caged reagents are ordinarily in an inert state. When exposed to intense ultraviolet light, though, cleavage occurs only in those areas exposed to light and the reagent is activated in that area. These caged reagents are administered to biological specimens for observation. By casting intense ultraviolet light only on specific areas of the observed specimen one wishes to see, the caged reagent is cleaved and activated in that area. Then specific light is cast on the observed specimen by an epi-fluorescent illuminator and the biological specimen is observed in a state of fluorescent illumination by a microscope.

In microscope observations where caged reagents, like those described above, are used, two kinds of illumination devices are needed; that is, an intense, epi-ultraviolet light illuminator that causes the caged reagent to cleave and become activated, and an epi-fluorescent illuminator that stimulates the observed specimen and renders it observable through fluorescent light. Thus, microscopes with an epi-fluorescent illuminator in the microscope base also need to add an epi-ultraviolet light illuminator, to cleave caged reagents, stacked in the optical axis direction.

Moreover, a photographic device like a CCD camera can be used in the upper part of a microscope barrel lens in order to render specimens observable by television cameras. In even more sophisticated microscopes, focal point detectors can be provided with auto-focus functions. Some focal point detectors are detachable from the microscope, while others are housed in the microscope. Japanese Laid Open Patent Report Hei 4-260015 discloses an example of a focal point detector having three photographic elements: one for the pre-focus position, another for the accurate focus position, and the other for the post-focus position. Furthermore, U.S. Pat. No. 3,721,827 discloses the detection of light from a specimen via a divided sensor. One half of the optical path in the detector is used to cast light, and the other half is used to receive light.

Additional illuminators, as mentioned above, require new space for microscopes commonly equipped with a single illuminator in microscope bases. Thus, problems arise for up-light microscopes because the addition of illuminators causes the eye point position to become too high, the original observing positioning to change, and the workability to become poor. For inverted microscopes, problems occur in that the stage level becomes too high and, as mentioned earlier, the workability becomes poor. Also, dimensional compatibility with auxiliary equipment, such as a micromanipulator, may be jeopardized when the stage level is charged.

Also, some microscopes have conversion mechanisms in the optical path of the illuminator in the microscope base to allow switching between the optical path of the illuminator and that of another illuminator. However, such devices are complex and costly. Moreover, when a microscope is provided with photographic devices, focal point detectors, and other such optical detectors, the microscope becomes large due to the space necessary for the devices.

SUMMARY OF THE INVENTION

An object of the present invention is to provide a turret and a microscope provided with an illuminator or an optical detector that efficiently uses space provided by a tilted lens turret. Other advantages and purpose of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purpose of the invention, as embodied and broadly described herein, the invention comprises a microscope turret assembly comprising a turret, rotatably mountable to a support member, for retaining a plurality of objective lenses and enabling the selection of one observing objective lens from the plurality of the objective lenses by rotation of the turret. The support member is attachable to a microscope main body at an angle relative to a reference plane orthogonal to an optical axis of the observing objective lens, thereby creating a space between the turret and the reference plane. Located in the space is reflective means for cooperating with one of an illuminator capable of casting light on an observed specimen through the observing objective lens and an optical detector capable of detecting light from the observed specimen through the observing objective lens.

In another aspect of the invention, the space is defined by an underside surface of the turret and the reference plane. The reference plane passes through an end of the turret that is oriented toward a plane of rotation of the turret and is furthest away from the optical axis. The reference plane is orthogonal to an optical axis of the observing objective lens.

In another aspect of the invention, the reflective means does not protrude beyond the reference plane.

Still in another aspect of the invention, the support member is removably attached to the microscope main body.

In yet another aspect of the invention, the support member has an integral casing to store at least one of the illuminator and the optical detector located in the space.

In another aspect of the invention, the support member has a storage member to store entirely at least one of the illuminator and the optical detector.

In another aspect of the invention, the illuminator is an epi-fluorescent illuminator.

In still another aspect of the invention, the illumination device is a caged reagent cleaving illuminator.

In another aspect of the invention, the illuminator is a laser manipulation optical system.

In another aspect of the invention, the illuminator is a confocal optical system creating a confocal microscope.

In another aspect of the invention, the optical detector is a focal point detector.

Another aspect of the invention lies in the provision of a microscope comprising a turret, rotatably mountable to a support member, for retaining a plurality of objective lenses and enabling the selection of one observing objective lens from the plurality of objective lenses by rotation of the turret. The support member is attachable to a main body of the microscope at an angle relative to a reference plane orthogonal to an optical axis of the observing objective lens creating a space between the turret and the reference plane. An illuminator capable of casting light on an observed specimen through the objective lens is also provided. Reflective means for the illuminator is located in the space.

In another aspect of the invention, a microscope comprises a turret, rotatably mountable to a support member, for retaining a plurality of objective lenses and enabling the selection of one observing objective lens from the plurality of the objective lenses by rotation of the turret. The support member is attachable to a microscope main body at an angle relative to a reference plane orthogonal to an optical axis of the observing objective lens creating a space between the turret and the plane. An optical detector capable of detecting light from an observed specimen through the objective lens is also provided. Reflective means for the optical detector is located in the space.

In another aspect of the invention, an imaging element included in the optical detector is located in the space.

In another aspect of the invention, a microscope turret assembly is provided that comprises a turret, rotatably mountable to a support member, for retaining a plurality of objective lenses and enabling the selection of one of the objective lenses from the plurality of objective lenses by rotation of the turret. The support member is attachable to a microscope main body at an angle relative to a reference plane orthogonal to an optical axis of the selected one of the objective lenses creating a space between the turret and the reference plane. The support member is attachable to a microscope main body, and an optical path divider is retained by the support member. The divider is located in the microscope optical path in the space and divides the microscope optical path.

In yet another aspect of the invention, the support member includes a movable retainer for inserting the optical path divider into the optical path and removing the optical path divider from the optical path. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
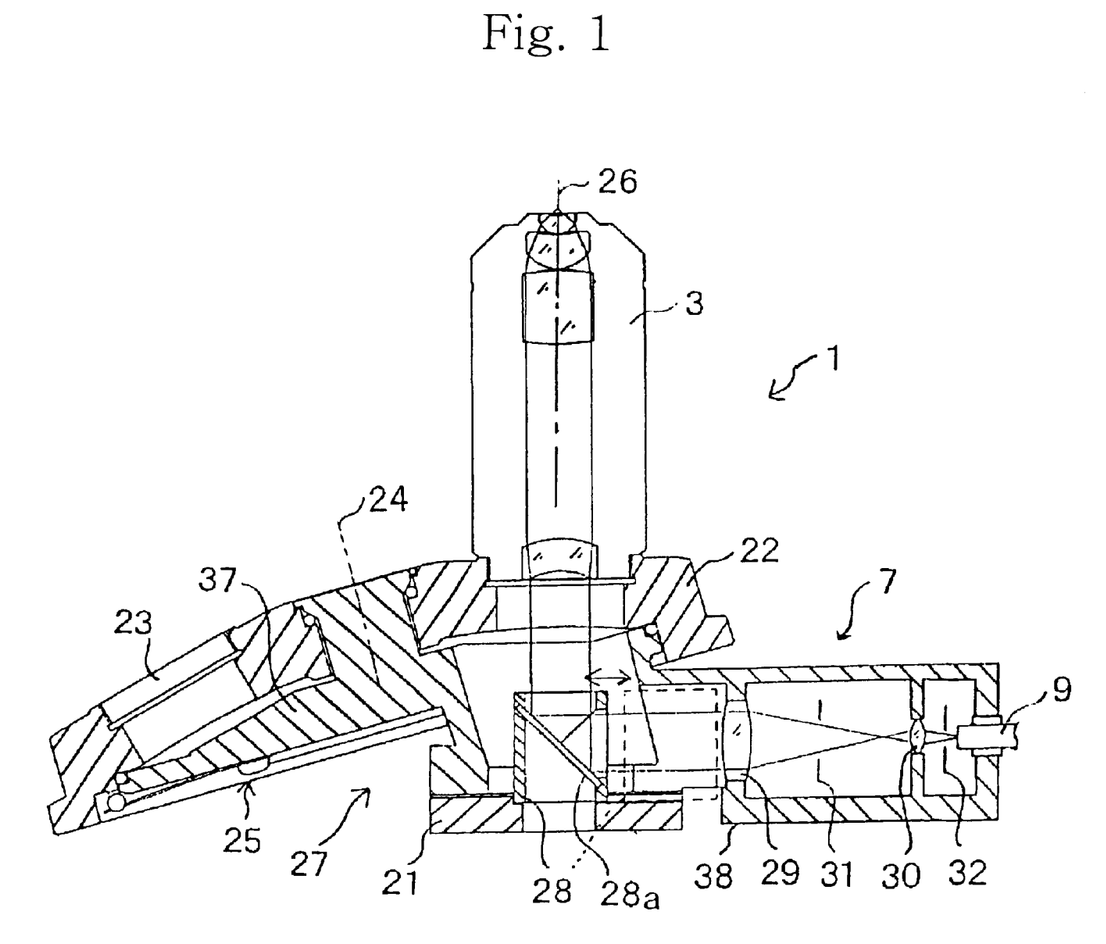
FIG. 1 is a cross-sectional view of a microscope turret assembly according to this invention.
Figure 2:
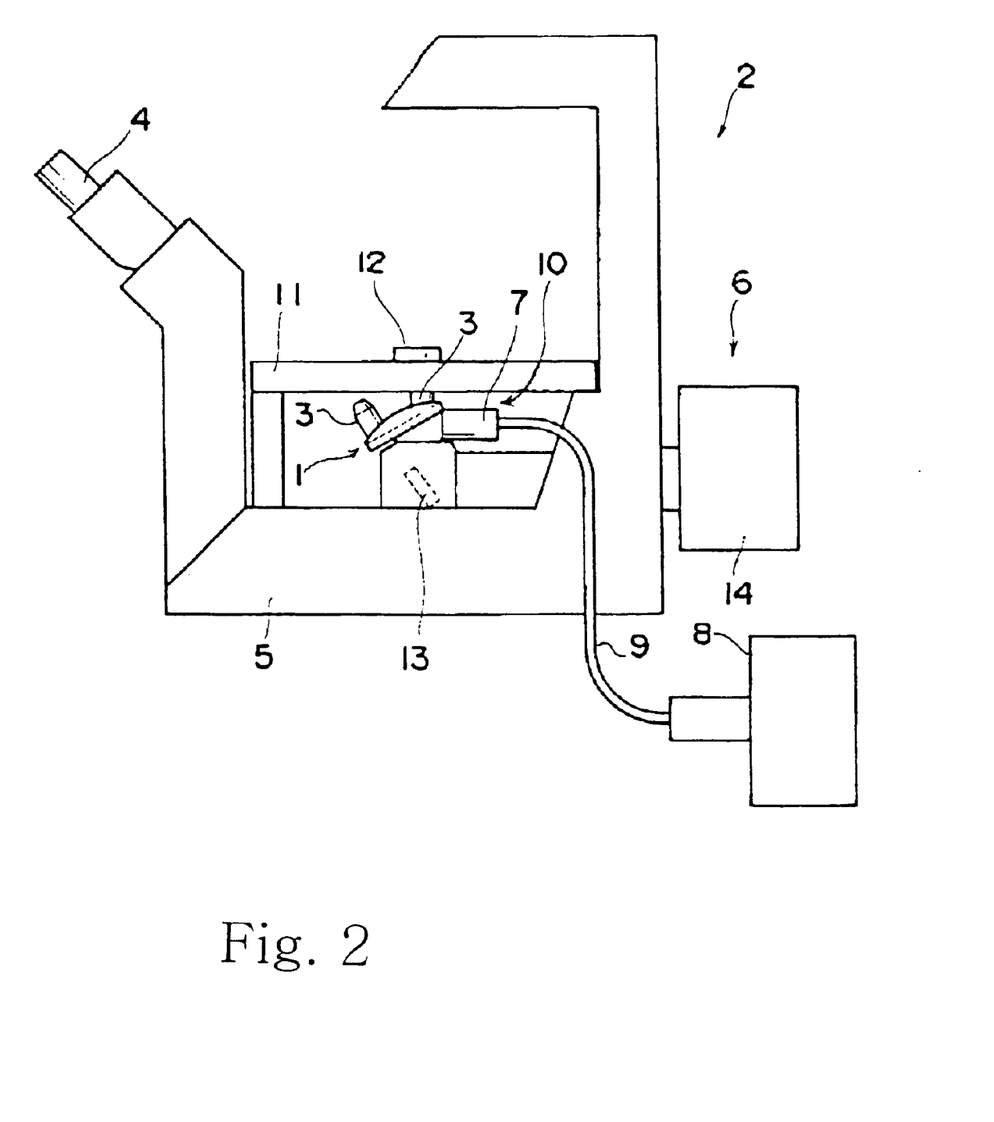
FIG. 2 is a side view of a inverted-type microscope equipped with the microscope turret assembly according to this invention.

FIG. 1 is a cross section of a microscope turret assembly (1) related to the present invention. FIG. 2 is a side view of an inverted-type microscope (2) equipped with the turret assembly (1) of FIG. 1.

In the embodiment illustrated in FIG. 2, the turret assembly (1) is attached to the inverted type microscope (2). An objective lens is designated by a reference numeral (3), and multiple objective lenses (3) may be attached to the turret (22). The inverted-type microscope (2) comprises an ocular lens (4), a microscope base (5), which is the main body of the microscope (2), and an epi-fluorescent illuminator (6) attached to the microscope base (5). The reference number (7) designates an optical system for an illuminator (10) for caged reagent cleaving, and (8) designates a light source comprising a xenon or mercury lamp. An optical fiber cable (9) transmits ultraviolet light from the light source (8) to the optical system (7). The caged reagent cleaving illuminator (10) comprises the optical system (7), the light source (8), and the optical fiber cable (9). A stage (11) is provided to house an observed specimen (12). As mentioned above, the first embodiment of the microscope is provided with two illuminators: a caged reagent cleaving illuminator (10) for microscope observations that involve caged reagents, and an epi-fluorescent illuminator (6) to observe specimens by fluorescent light. When microscope observations use caged reagents, the technology explained in the background section is used.

Next is a detailed explanation of the turret assembly (1) using FIG. 1. The reference number (21) designates a dovetail to attach the microscope turret assembly (1) to a microscope main body. This dovetail is, preferably, either circular or square. By using a dovetail mechanism, the turret assembly (1) can be easily attached to, and removed from, the microscope main body. A turret (22) with multiple holes (23) to attach objective lenses has center of rotation on rotation axis (24). An objective lens for observation is selected from among multiple objective lenses by rotating the turret (22). Since the rotation axis (24) is tilted at an angle relative to an optical axis (26) of the objective lens (3) (hereafter simply called "optical axis"), its plane of rotation (25) is inclined at an angle relative to the reference plane orthogonal to the optical axis (26). When the plane of rotation (25) is tilted at an angle, a space (27) forms in the underside surface of the turret (22) that retains the objective lenses (3). Taking advantage of this space (27), reflective means, such as a dichroic mirror (28a) and a dichroic mirror block (28), of the caged reagent cleaving illuminator, is located in the space (27). Details about the space (27) are discussed later. A support member (37) for the turret (22) specifies the angle of the rotation axis (24). The support member (37), the rotation axis (24), and the dovetail (21) are all integrated, and define the main body.

A dichroic mirror block (28) holds a dichroic mirror (28a) on a diagonal line and is located in the space (27). The dichroic mirror (28a) reflects ultraviolet light and has properties by which excitation light (for fluorescent light observation) with a longer wavelength than ultraviolet light can penetrate, as can fluorescent light. Namely, ultraviolet light led through the optical fiber cable (9) from the light source (8) of the caged reagent cleaving illuminator (7) is reflected by the dichroic mirror (28a) and, through the objective lens (3), radiates the observed specimen (12). The reference numbers (29) and (30) designate lenses, (31) designates a field diaphragm and (32) designates an aperture stop. These, together with dichroic mirror block (28), comprise the optical system (7) of the caged reagent cleaving illuminator (10). This optical system (7) is housed in a casing (38), and the casing (38) is integrated with the support member. An optical fiber cable (9) is connected to an end of the casing (38).

Also, the dichromic mirror block (28) is retained in the casing (38) such that it can move between the inside position of the optical path, shown by the solid line in FIG. 1, and the outside position of the optical path, shown by the broken line. The inside position of the optical path is a position in the microscope optical path occupied by the objective lens (3), while the outside optical path position is a position away from the microscope optical path through the objective lens (3). In this structure, when ultraviolet light for caged regent cleaving is unnecessary, the dichromatic mirror block (28) can be located in a position outside the optical path so that observation specimens can be illuminated without lowering the excitation light volume from the epi-fluorescent illuminator (6).

In FIG. 2, the epi-fluorescent illuminator (6) has a dichroic mirror (13) below the turret (22). Excitation light that can be emitted from the light source (14) to illuminate the observed specimen (12) with fluorescent light is then reflected toward the observed specimen (12). The observed specimen (12) receives the excitation light and emits fluorescent light. That fluorescent light passes through the objective lens (3), the dichroic mirror (28a) in FIG. 1, the dichroic mirror (13) in FIG. 2, and then reaches the ocular lens (4) via a mirror (not shown) provided in the microscope base (5), thus enabling fluorescent observation.

Figure 3:
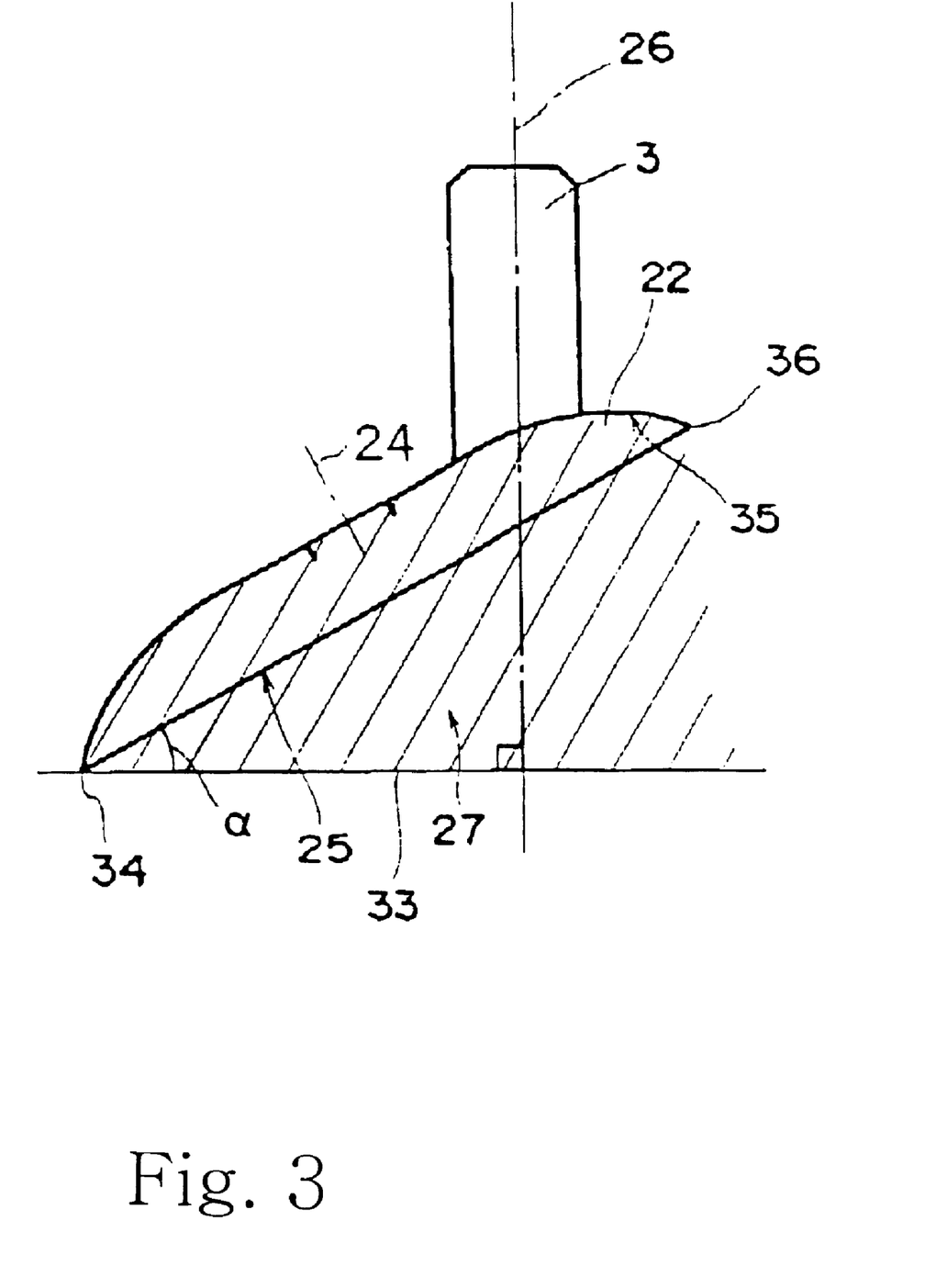
FIG. 3 is an explanatory diagram for a space formed by tilting a plane of rotation at an angle.

FIG. 3 shows how a space (27) is formed by tilting the plane of rotation (25) at an angle. In FIG. 3, the plane of rotation (25) of the turret (22) of the turret assembly (1) tilts at an angle a relative to the reference plane (33) orthogonal to the optical axis (26). Accordingly, a space (27) marked by a slanted line is formed between the underside surface (35) of the turret (22) that retains objective lenses (3), and the reference plane (33). The reference plane (33) passes the outer edge of the turret (22) at a point (34) furthest away from optical axis, and the reference plane (33) is orthogonal to the optical axis (26). There are spaces occupied by the turret (22), the rotation axis, etc. on underside surface (35). The space (27) refers to a space other than the occupied spaces above.

As in FIG. 1, the dichroic block (28) is located in the space (27) such that it does not protrude from the reference plane (33) in FIG. 3 along the observation system axis (26). The lenses (29) and (30), the field diaphragm (31), and the aperture stop (32), are also positioned such that they do not protrude from the reference plane (33) along the direction of the observation optical axis. Although the kind of structure discussed above is used in the present embodiment, the dichroic mirror block (28) and other such optical systems of the illuminator (7) can be arranged to protrude from the reference plane (33) in the direction along the observation optical axis (26). If at least a part of the optical system of the illuminator (7) is located in the space (27), then the space (27) can be used effectively.

Because the space (27) created by tilting the turret (22) of the turret assembly (1) is used effectively and a part of the block (28) of the caged reagent cleaving illuminator (10) can be placed therein, an inverted-type microscope outfitted with multiple illuminators can be made inexpensively, without any need to provide a new space under the turret, without changing the height of the stage (11) and such, and without sacrificing workability or dimensional compatibility with auxiliary equipment.

In the first embodiment, moreover, a dovetail is used to attach the support member to the microscope's main body. However, the invention is not limited to the structures with dovetails. A screw may also be used, for example, or another structure for stationary attachment of the turret assembly (1) may be used so that the turret assembly (1) is not removable. Moreover, the space (27) has a part of the caged reagent cleaving illuminator (10) in this embodiment. However, the caged reagent cleaving illuminator (10) can be attached in the microscope base and a part of the epi-fluorescent illuminator (6) can be provided in the space (27).

Also, because the optical fiber cable (9) can be attached and removed from the casing (38), the light wavelength conducted to the optical system (7) can be changed easily to a different type by simply connecting different kinds of light sources and optical fiber cables to the casing (38). Naturally, when the optical fiber cable (9) is connected to the casing (38), the type of light source (8) connected to the optical fiber cable (9) may be changed. Also, the optical system (7) is located on the side opposite to the end (34) shown in FIG. 3 with respect to the optical axis (26) of the objective lens (3). The space (27) can thus be used effectively.

Figure 4:
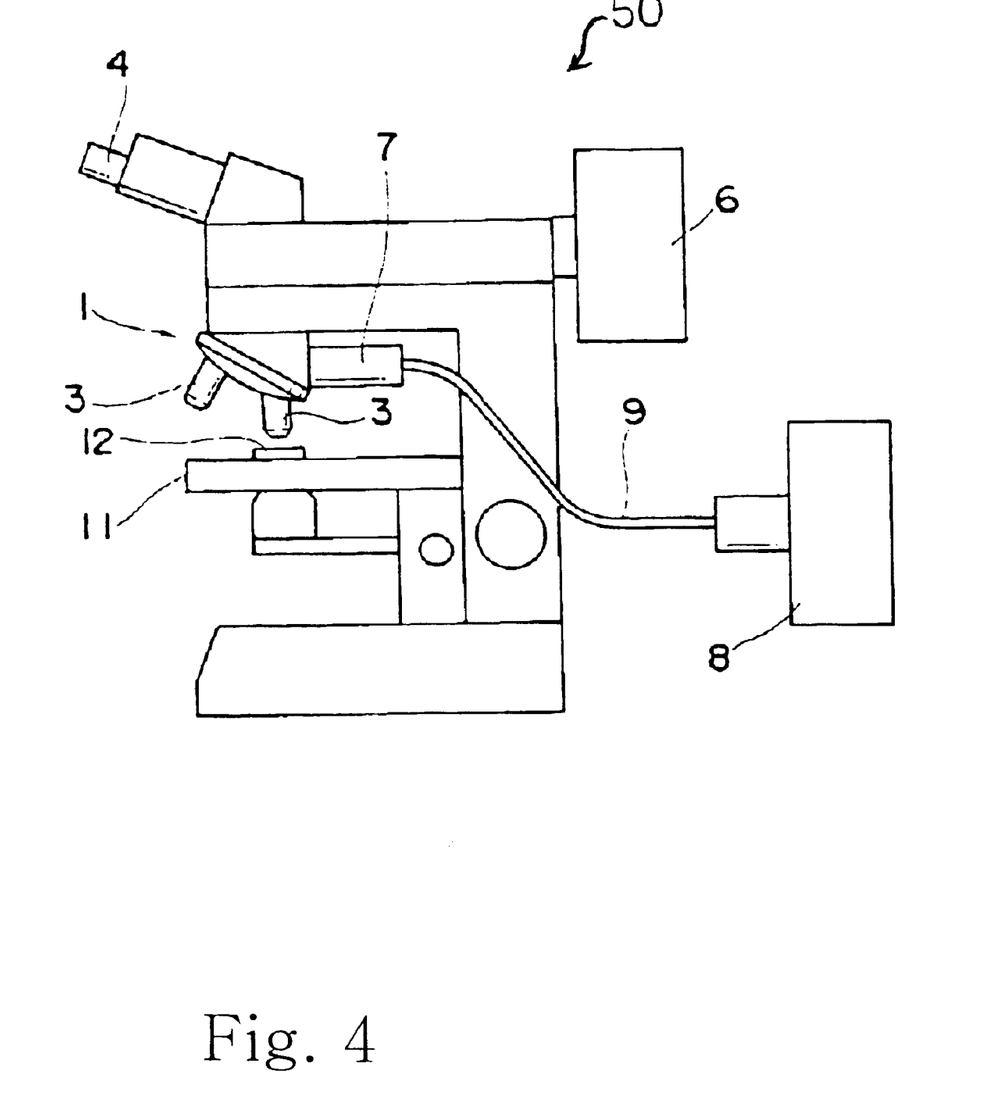
FIG. 4 is a side view of a standing-type microscope equipped with the microscope ret assembly according to this invention.

In FIG. 4, the turret discussed above is attached to an up-light microscope (50). This figure is a summary side view of the entire up-light microscope (50). As the functions of various components are identical to those in the inverted-type microscope in FIG. 2, the same numerical references are used and their explanations are omitted. In the up-light microscope, the turret assembly (1) is attached so it has the opposite orientation of the inverted-type microscope. As in the previous explanation, an up-light microscope can be provided such that the space of the tilted part in the upper portion of the turret is used effectively, the position of the ocular lens (4), i.e. the eye point, is not raised, workability is not sacrificed, and a device with multiple illuminators can be produced inexpensively.

Embodiment 2

Figure 5:
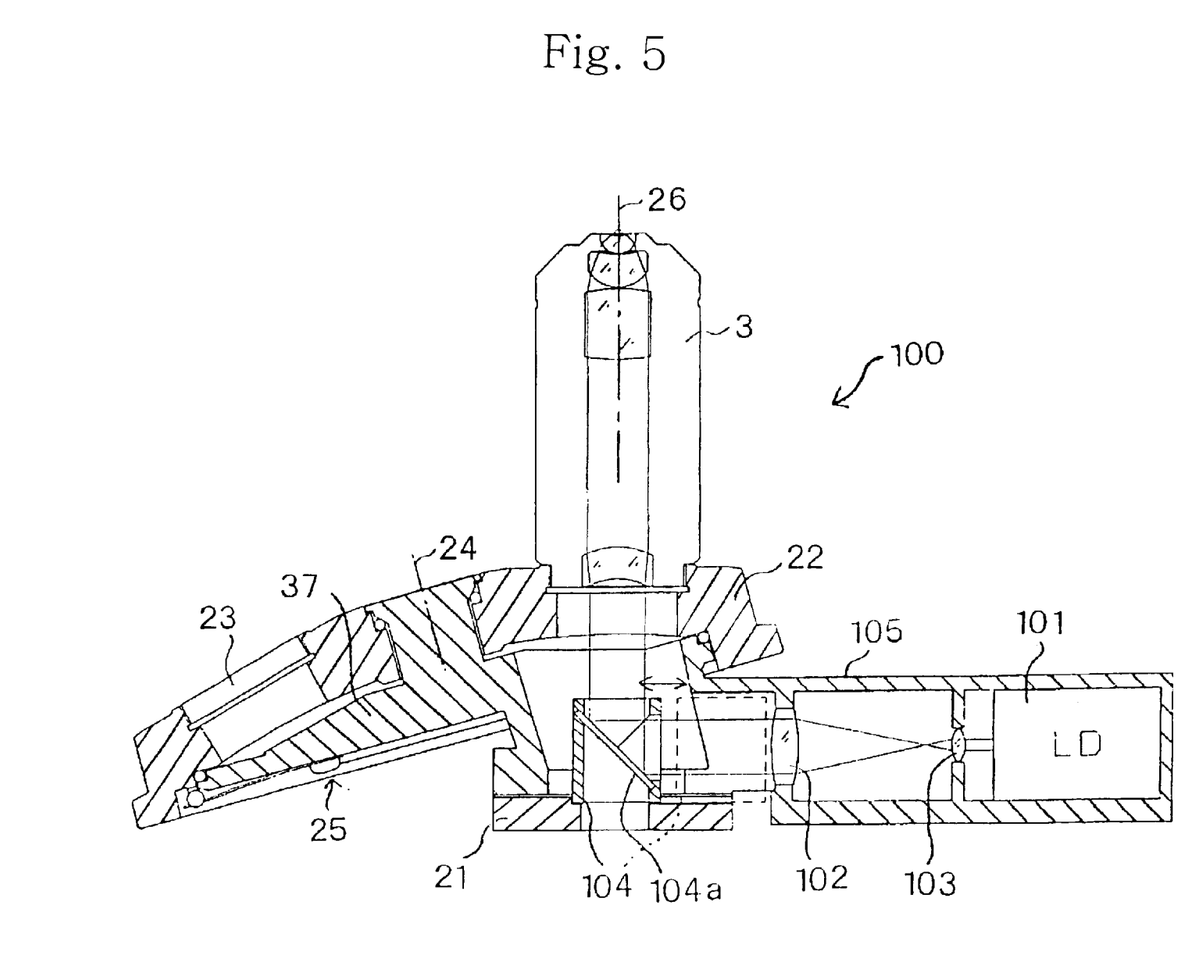
FIG. 5 is a cross-sectional view of a microscope turret assembly according to a second embodiment of this invention.

FIG. 5 is a cross section of an embodiment in which a laser manipulation optical system is incorporated in a turret (100). Structural elements having the same function as in FIG. 1 bear the same numerical references, and their explanations are omitted. The reference number (101) designates a laser diode that radiates laser beams. The laser beams widen to match the pupil diameter of the objective lens (3) by the beam expander comprising lenses (102) and (103). The laser beams can then be transmitted to the dichroic mirror block (104) retaining the dichroic mirror (104a). The dichroic mirror block (104) is constructed to be insertable into and removable from the optical axis (26) of the objective lens (3) by a guide mechanism (not shown). The beams transmitted to the dichroic block (104) are reflected from the dichroic mirror (104a) toward the objective lens (3). The beams are converged by the objective lens (3) to the observed specimen (12). Micro objects on an observed specimen can be captured by a point of convergence of the laser beams. The principle of capturing micro objects with laser beams is publicly known (e.g., U.S. Pat. No. 4,893, 886); thus, the explanation is omitted. In the second embodiment, most of the laser beams converge on the optical axis (26) of the objective lens (3), and thus a micro object captured can be directed to the convergence point by moving the stage with a mechanism not shown in the figure.

The second embodiment also has a laser diode (101) corresponding to the light source (8) in the first embodiment. This diode is housed in a casing (105) formed integrally with the support member. Namely, the overall laser manipulation optical system is housed in the casing (105) and is integrally formed with the turret (100).

As explained above, the same effects as the first embodiment are exhibited. Also, the overall laser manipulation optical system in the second embodiment is made as an integral part of the turret (100). The laser manipulation optical system can be exchanged with other illuminators by a simple operation.

Embodiment 3

Figure 6:
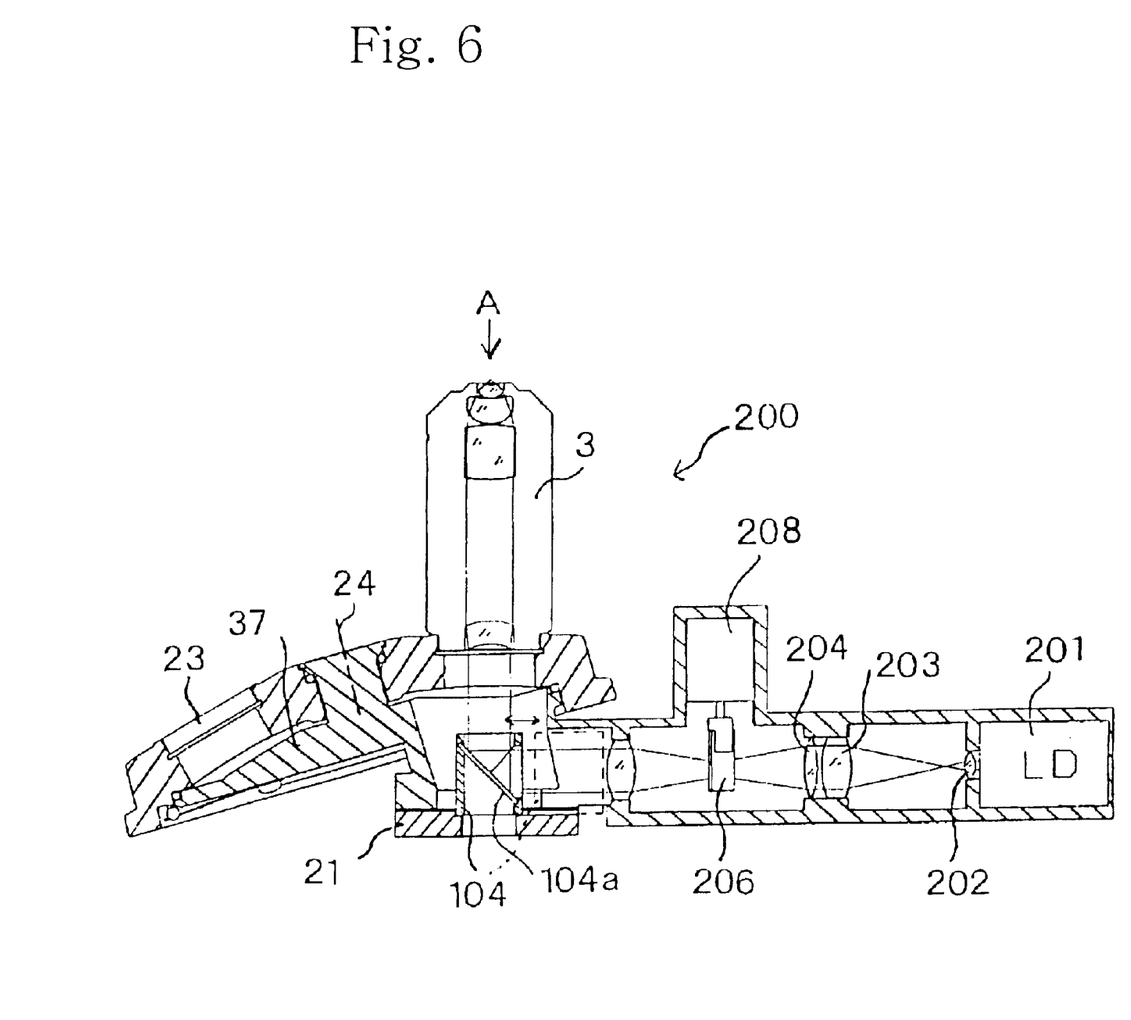
FIG. 6 is a cross-sectional view of a microscope turret assembly according to a third embodiment of this invention.
Figure 7:
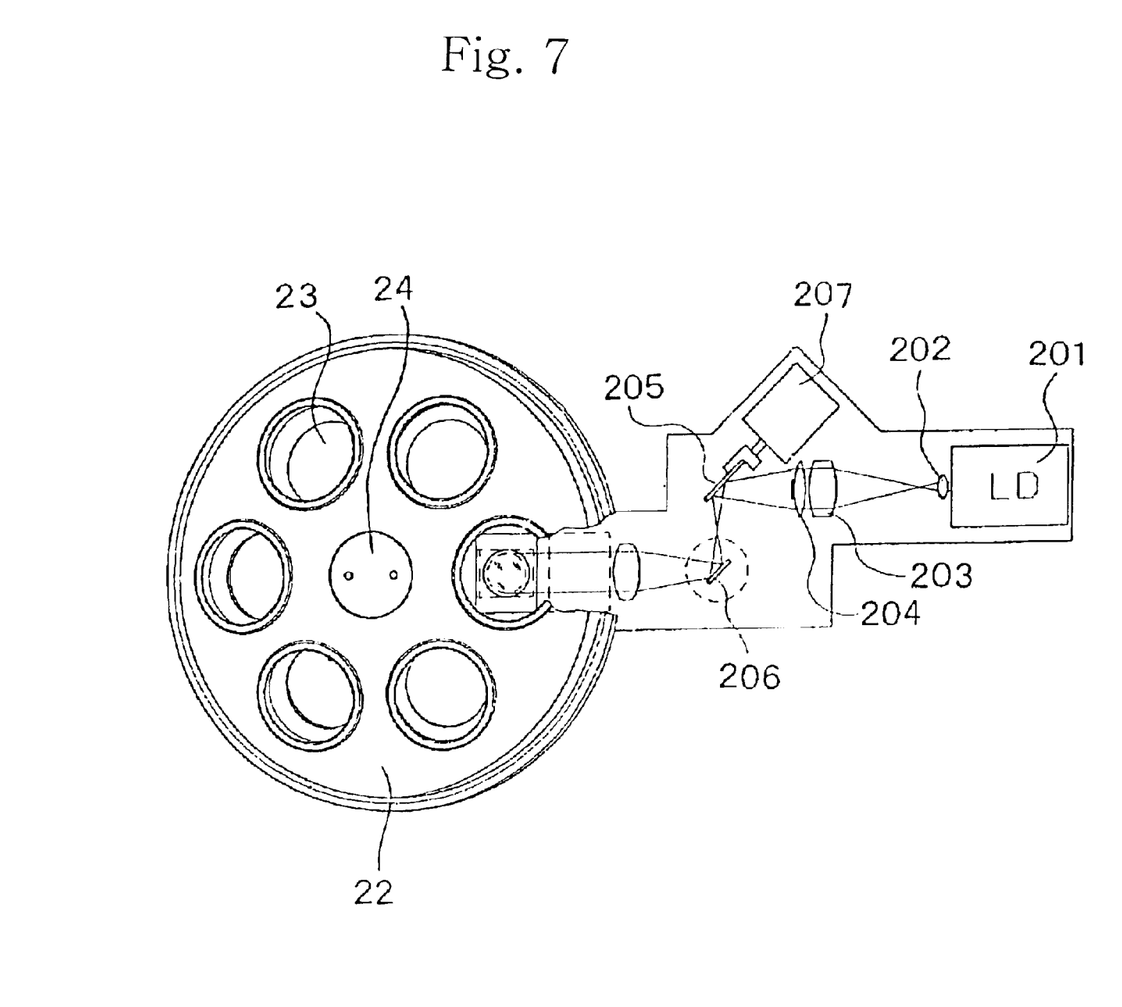
FIG. 7 is a top view of the microscope turret in FIG. 6.

FIGS. 6 and 7 show an embodiment whereby the turret (200) incorporates a laser manipulation system different from that in Embodiment 2. FIG. 6 is a cross section of the turret (200). FIG. 7 is a top view of the turret (200) in FIG. 6 seen from the direction of arrow A. Structural components having functions identical to those in Embodiment 2 of FIG. 5 have the same numerical references and their explanations are omitted.

In FIGS. 6 and 7, laser beams radiated from a laser diode (201) are enlarged by lenses (202) and (203). They are then converged by lens (204), and a pupil area of the beams having an area conjugate to the objective lens (3) pupil is formed near galvano-mirrors (205) and (206). The galvano-mirror (205) is rotated by a galvano-driving unit (207) (FIG. 7), and the galvano-mirror (206) is rotated by another galvano-driving unit (208) (FIG. 6). As in FIG. 7, the angles of orientation of the rotation axes of these two units differ by 90°, so the point of convergence of the laser beams on the observed specimen may be moved at will within the observed specimen's field by the rotational drive of the galvano-mirrors (205) and (206). As a result, micro objects at random positions on the observed specimen can be captured. Also, a micro object captured can be moved freely. That being so, Embodiment 3 exhibits the same effects as Embodiment 2.

The free movement of the laser beam convergence point within the field of the observed specimen using the above-mentioned galvano-mirrors can also be applied to confocal microscopes (including laser scanning microscopes). In confocal microscopes, laser beams radiated from the laser light source, as described earlier, first converge near the galvano-mirrors. Then the galvano-mirrors are driven and the laser beams' point of convergence scans the field of the observed specimen. In this fashion, microscopic observation is conducted. Fluorescent light is emitted at the laser beam convergence point on the observed specimen and the status of the fluorescent gradually shifts by scanning. The fluorescent status of the observed specimen can be observed by microscope by using a detector to detect this shift in the fluorescent status, processing the image, and displaying that image on a monitor or such.

As in Embodiment 3 described above, by placing the confocal optical system of a confocal microscope in the space of the slanted area under the turret, the same effect as Embodiment 2 mentioned above can be exhibited without a need for a new space for the confocal optical system in the direction of the optical axis of the observation system.

Embodiment 4

Figure 8:
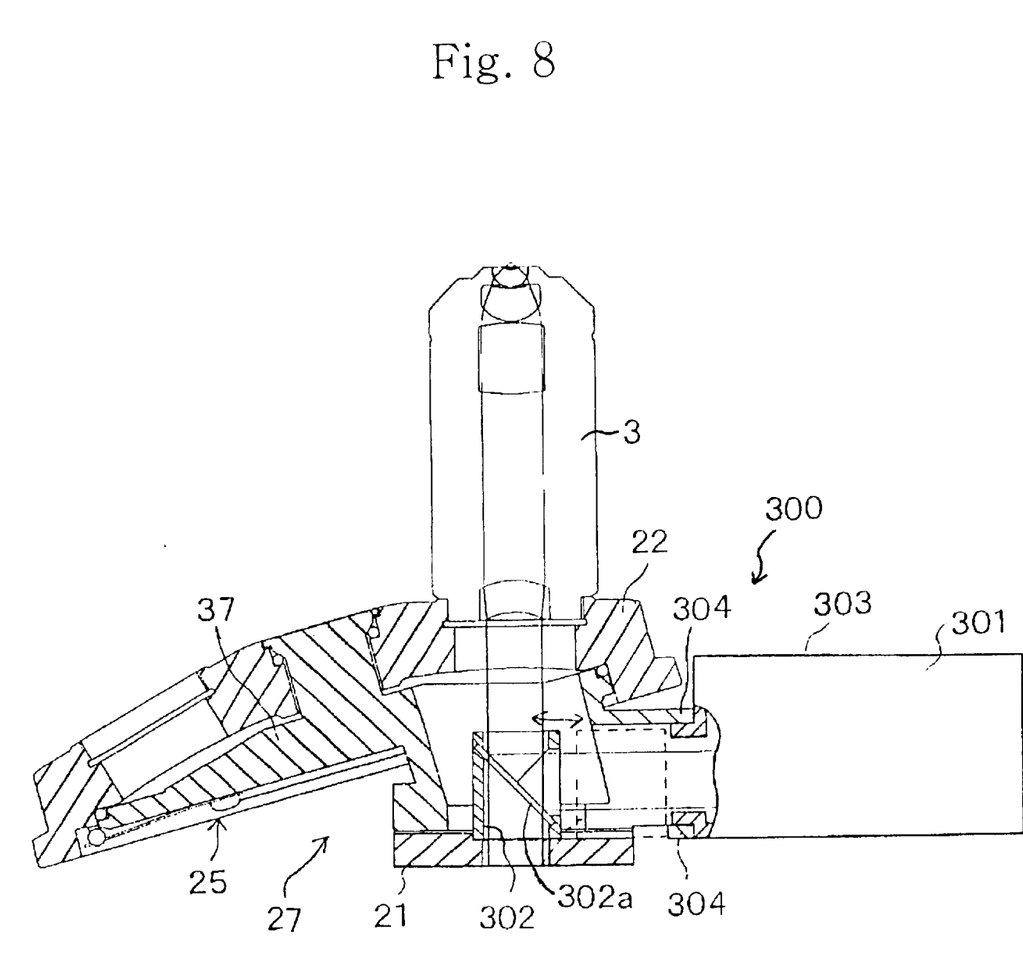
FIG. 8 (a cross-sectional view of a microscope turret assembly according to a fourth embodiment of this invention.

FIG. 8 shows a cross section of an embodiment whereby a focal point detector (301) for auto-focusing is attached to the turret (300) by a set machine screw or such (not shown in the figure). The focal point detector (301) is attached to the turret at the same position as in Embodiments 1–3. Also, structural elements in this Embodiment having the same function as those in FIG. 1 have identical numerical references, and their explanations are omitted.

A measurement light source, a shade plate to shade half the optical path, a half mirror, a divided sensor, and so on are located in the focal point detector (301). As a detailed structure is shown in, for example, U.S. Pat. No. 3,721,827, an explanation is omitted here.

Measurement light projected from a focal point detector (301) is reflected by a dichroic mirror (302a) retained in the dichroic mirror block (302) and the light is cast onto the specimen through the objective lens. The measurement light reflected by the specimen is again detected by the divided sensor in the focal point detector (301) through the objective lens (3) and the dichroic mirror (302a). Signals from this divided sensor are output by the microscope's main control system (not shown in the figure) and are used as auto-focusing signals. The casing (303) of the focal point detector (301) is fastened to the casing (304) of the turret (300) via a set machine screw or the like (not shown).

With the structure mentioned above, the effect (as with Embodiments 1–3 discussed above) is that active use is made of the space of the tilted part of the turret (300), and a focal point detector (301) for auto-focusing can be provided. Also, the same effects described above are achieved even if, rather than a focal point detector (301), an imaging device outfitted with an image-forming optical system and a CCD camera, a photometric device, or another device to detect some specimen light is attached. In such cases, the dichroic mirror (302a) in FIG. 8 must be an element that will divide the light at a given light ratio, e.g., a half mirror or a total reflection mirror.

Embodiments 1–4 above illustrate the location of various kinds of illuminators and optical system devices in the tilted area below the turret. However, the illuminators and optical system devices do not have to be limited to the types mentioned above. The present invention can be applied to all other illuminators and optical systems used in microscope observation.

It will be apparent to those skilled in the art that various modifications and variations can be made in the microscope of the present invention and in construction of this microscope without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. An illuminating objective lens turret assembly for microscope having a main body, comprising:
   a turret for retaining a plurality of objective lenses protruding from one of two sides of the turret, and rotatable on a turret axis to select one of the plurality of objective lenses as an observing objective lens, each of the objective lenses having an optical axis inclined at a common angle relative to the turret axis;
   a support member attachable to the main body and supporting the turret from the other of the two sides with the turret axis at an angle relative to a reference plane having directional dimensions orthogonal to the optical axis of the observing objective lens, the other of the two sides of the turret having an edge lying in the reference plane and defining a space with the reference plane at the optical axis of the observing objective lens;

a first illuminator system for guiding first illumination light to the optical axis of the observing objective lens, the first illuminator system having a reflector insertable into and removable from the optical axis of the observing objective lens, the first illumination light being prevented from being guided to the optical axis of the observing objective lens when the reflector is removed from the optical axis, the reflector being located in the space defined by the optical axis of the observing objective lens, the other of the two sides of the turret, and the reference plane; and a second illuminator system attachable to the main body for directing illumination to the observing objective lens when the reflector of the first illuminator system is removed from the optical axis of the observing lens.

2. The illuminating objective lens turret assembly according to claim 1, wherein the first reflector is located in the space and does not protrude beyond the reference plane.

3. The illuminating objective lens turret assembly according to claim 2, wherein the support member is removably attached to the main body.

4. The illuminating objective lens turret assembly according to claim 3, wherein the first illuminator system is an epi-fluorescent illuminator.

5. The illuminating objective lens turret assembly according to claim 3, wherein the first illuminator system is a caged reagent cleaving illuminator.

6. The illuminating objective lens turret assembly according to claim 3, wherein the first illuminator system is a laser manipulation optical system.

7. The illuminating objective lens turret assembly according to claim 3, wherein the first illuminator system is a confocal optical system creating confocal microscope.

8. The illuminating objective lens turret assembly of claim 1, wherein the first illumination light is blocked from the optical axis of the observing objective lens when the reflector is removed from the optical axis.

9. An illuminating objective lens turret assembly for microscope having a main body, comprising:

a turret for retaining a plurality of objective lenses protruding from one of two sides of the turret, and rotatable on a turret axis to select one of the plurality of objective lenses as an observing objective lens, each of the objective lenses having an optical axis inclined at a common angle relative to the turret axis;

a support member attachable to the main body and supporting the turret from the other of the two sides with the turret axis at an angle relative to a reference plane having directional dimensions orthogonal to the optical axis of the observing objective lens, the other of the two sides of the turret having an edge lying in the reference plane and defining a space with the reference plane at the optical axis of the observing objective lens;

an optical detector capable of detecting light from an observed speciment through the observing objective lens, having a reflector insertable into and removable from the optical axis of the observing objective lens, the light from the observed specimen being prevented from traveling to the optical detector when the reflector is removed from the optical axis, the reflector being located in the space defined by the optical axis of the observing objective lens, the other of the two sides of the turret, and the reference plane; and an illuminator system attachable to the main body for directing illumination to the observing objective lens when the reflector of the optical detector is removed from the optical axis of the observing lens.

10. The illuminating objective lens turret assembly according to claim 9, wherein the optical detector is a focal point detector, which detects a light from specimen through the observing objective lens.

11. The illuminating objective lens turret assembly of claim 9, wherein the light is blocked from traveling to the optical detector when the reflector is removed from the optical axis.

* * * * *

UNITED STATES PATENT AND TRADEMARK OFFICE
CERTIFICATE OF CORRECTION

PATENT NO.    : 6,313,944 B1
DATED         : November 6, 2001
INVENTOR(S)   : Takashi Kawahito It is certified that error appears in the above-identified patent and that said Letters Patent is hereby corrected as shown below:

Column 10, claim 9,
Line 19, "speciment" should read -- specimen --.

Signed and Sealed this

Second Day of April, 2002

Attest:

JAMES E. ROGAN
Attesting Officer        Director of the United States Patent and Trademark Office